(12) United States Patent
Oeztuerk et al.

(10) Patent No.: US 12,722,551 B2
(45) Date of Patent: Sep. 1, 2026

(54) VEHICLE HAVING A VEHICLE SEAT

(71) Applicant: Mercedes-Benz Group AG, Stuttgart (DE)

(72) Inventors: Abdulkadir Oeztuerk, Gaertringen (DE); Claus Geisler, Herrenberg (DE); Felix Ressi, Graz (AT); Desiree Kofler, Hausmannstaetten (AT)

(73) Assignee: Mercedes-Benz Group AG, Stuttgart (DE)

( * ) Notice: Subject to any disclaimer, the term of this patent is extended or adjusted under 35 U.S.C. 154(b) by 155 days.

(21) Appl. No.: 18/559,994

(22) PCT Filed: Apr. 26, 2022

(86) PCT No.: PCT/EP2022/061108
§ 371 (c)(1),
(2) Date: Nov. 9, 2023

(87) PCT Pub. No.: WO2022/238113
PCT Pub. Date: Nov. 17, 2022

(65) Prior Publication Data

US 2024/0227648 A1 Jul. 11, 2024

(30) Foreign Application Priority Data

May 10, 2021 (DE) ..................... 10 2021 002 469.9

(51) Int. Cl.
*B60N 2/90* (2018.01)
*B60N 2/64* (2006.01)
*B60R 21/207* (2006.01)

(52) U.S. Cl.
CPC ............ *B60N 2/914* (2018.02); *B60N 2/643* (2013.01); *B60R 21/207* (2013.01)

(58) Field of Classification Search
CPC .......... B60N 2/914; B60N 2/79; B60N 2/643; B60R 21/207
(Continued)

(56) References Cited

U.S. PATENT DOCUMENTS 5,464,246 A * 11/1995 Castro ...................... D04C 1/06 244/122 AG
5,556,128 A * 9/1996 Sinnhuber ......... B60R 21/23138 280/739
(Continued)

FOREIGN PATENT DOCUMENTS

CN 2481563 Y 3/2002
DE 34 32 871 A1 3/1986
(Continued)

OTHER PUBLICATIONS

International Search Report (PCT/ISA/210) issued in PCT Application No. PCT/EP2022/061108 dated Jul. 12, 2022 (2 pages).
(Continued)

*Primary Examiner* — Milton Nelson, Jr.
(74) *Attorney, Agent, or Firm* — Crowell & Moring LLP

(57) ABSTRACT

A vehicle includes a seat where an air cushion is disposed in a side region of a seat back. The air cushion has a first air chamber that is fillable with gas to form an armrest where the first air chamber has an air chamber portion which, in normal operation, is separated from the first air chamber, is not filled with a gas, and is fluidically coupled with a gas generator. The air cushion has a second air chamber which is fluidically coupled with the gas generator and which is fillable with a gas of the gas generator in an event of a vehicle collision. The air chamber portion and the second air chamber unfold between a first occupant located on the
(Continued)

vehicle seat and a trim part of the vehicle and/or between the first occupant and a second occupant by being filled by the gas of the gas generator.

16 Claims, 4 Drawing Sheets

(58) Field of Classification Search
USPC .................................................... 297/216.13
See application file for complete search history.

(56) References Cited

U.S. PATENT DOCUMENTS

| | | | | |
|---|---|---|---|---|
| 6,991,257 | B2 * | 1/2006 | Zhao | B60R 21/23138 280/730.2 |
| 7,793,973 | B2 * | 9/2010 | Sato | B60R 21/23138 280/730.2 |
| 10,343,644 | B2 | 7/2019 | Dry et al. | |
| 2002/0060485 | A1 | 5/2002 | Fischer et al. | |
| 2003/0184061 | A1 | 10/2003 | Honda et al. | |
| 2003/0222439 | A1 | 12/2003 | Akiyama et al. | |
| 2004/0075254 | A1 | 4/2004 | Honda | |
| 2006/0163933 | A1 | 7/2006 | Radu et al. | |
| 2009/0315373 | A1 * | 12/2009 | Thomas | B60R 21/207 297/216.13 |
| 2016/0311349 | A1 | 10/2016 | Honda et al. | |
| 2019/0232843 | A1 | 8/2019 | Welch et al. | |

FOREIGN PATENT DOCUMENTS

| | | | | |
|---|---|---|---|---|
| DE | 4436139 | C1 * | 3/1996 | B60N 2/4235 |
| DE | 198 11 615 | A1 | 9/1999 | |
| DE | 199 50 702 | A1 | 4/2001 | |
| DE | 103 45 677 | A1 | 5/2005 | |
| DE | 10 2008 029 339 | A1 | 1/2009 | |
| DE | 20 2010 009 114 | U1 | 10/2010 | |
| DE | 10 2013 112 902 | A1 | 5/2015 | |
| DE | 10 2014 016 351 | A1 | 5/2015 | |
| DE | 10 2015 010 262 | A1 | 3/2016 | |
| DE | 10 2017 010 794 | A1 | 7/2018 | |
| DE | 10 2018 124 649 | A1 | 4/2019 | |
| DE | 10 2019 002 895 | A1 | 10/2019 | |
| GB | 1 429 448 | A | 3/1976 | |
| JP | 50-33780 | A | 4/1975 | |
| JP | 60-140458 | U | 9/1985 | |
| JP | 61-43532 | U | 3/1986 | |
| JP | 2003-276553 | A | 10/2003 | |
| JP | 2004-314800 | A | 11/2004 | |
| JP | 2009-29356 | A | 2/2009 | |
| JP | 2016-55705 | A | 4/2016 | |
| JP | 2016-74244 | A | 5/2016 | |
| JP | 2016-203789 | A | 12/2016 | |
| JP | 2017-136994 | A | 8/2017 | |
| KR | 10-2020-0036068 | A | 4/2020 | |
| WO | WO 99/47380 | A1 | 9/1999 | |
| WO | WO 2018/193688 | A1 | 10/2018 | |
| WO | WO 2020/075625 | A1 | 4/2020 | |

OTHER PUBLICATIONS

Chinese-language Office Action issued in Chinese Application No. 202280033552.5 dated Feb. 11, 2026 (10 pages).

* cited by examiner

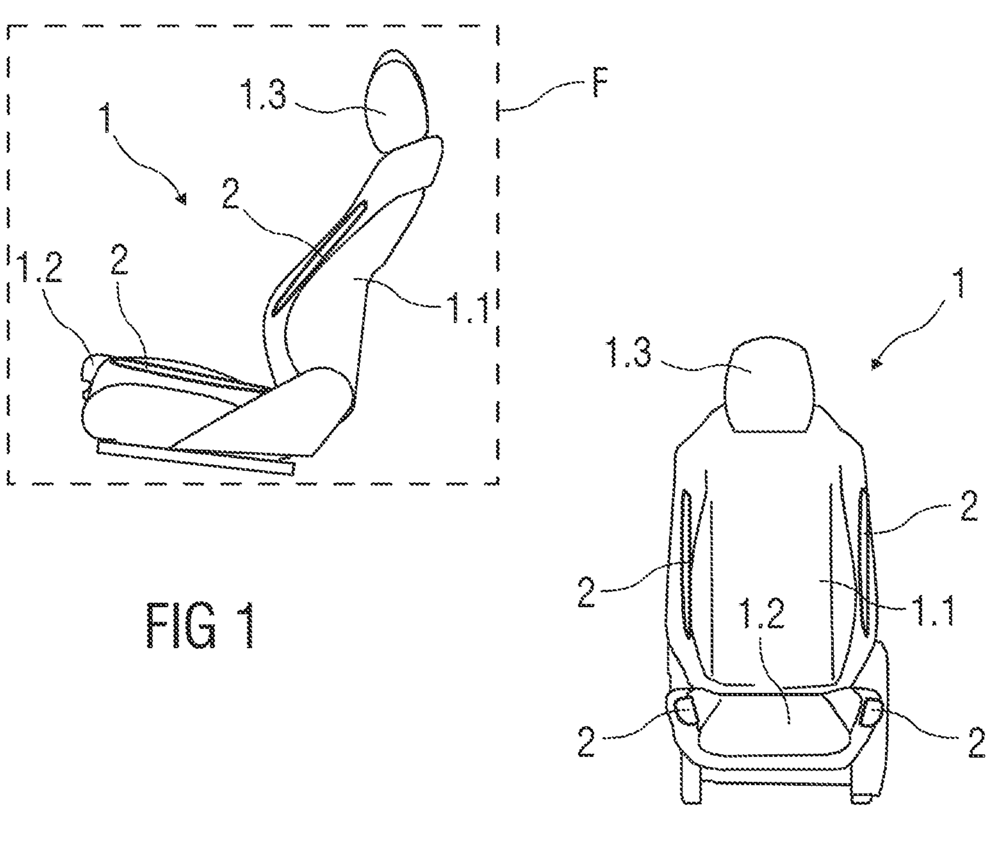
FIG 1
FIG 2
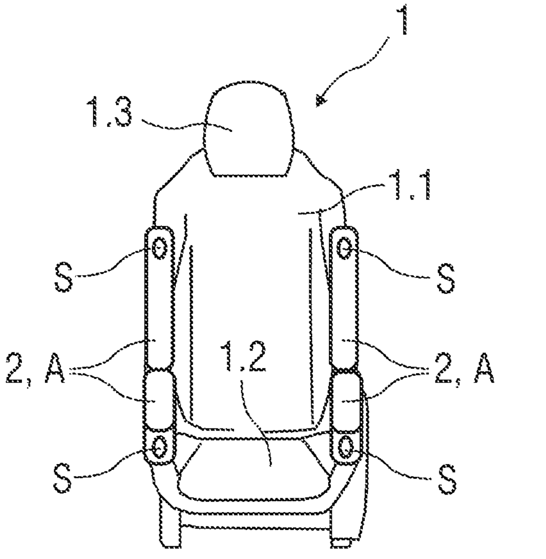
FIG 3

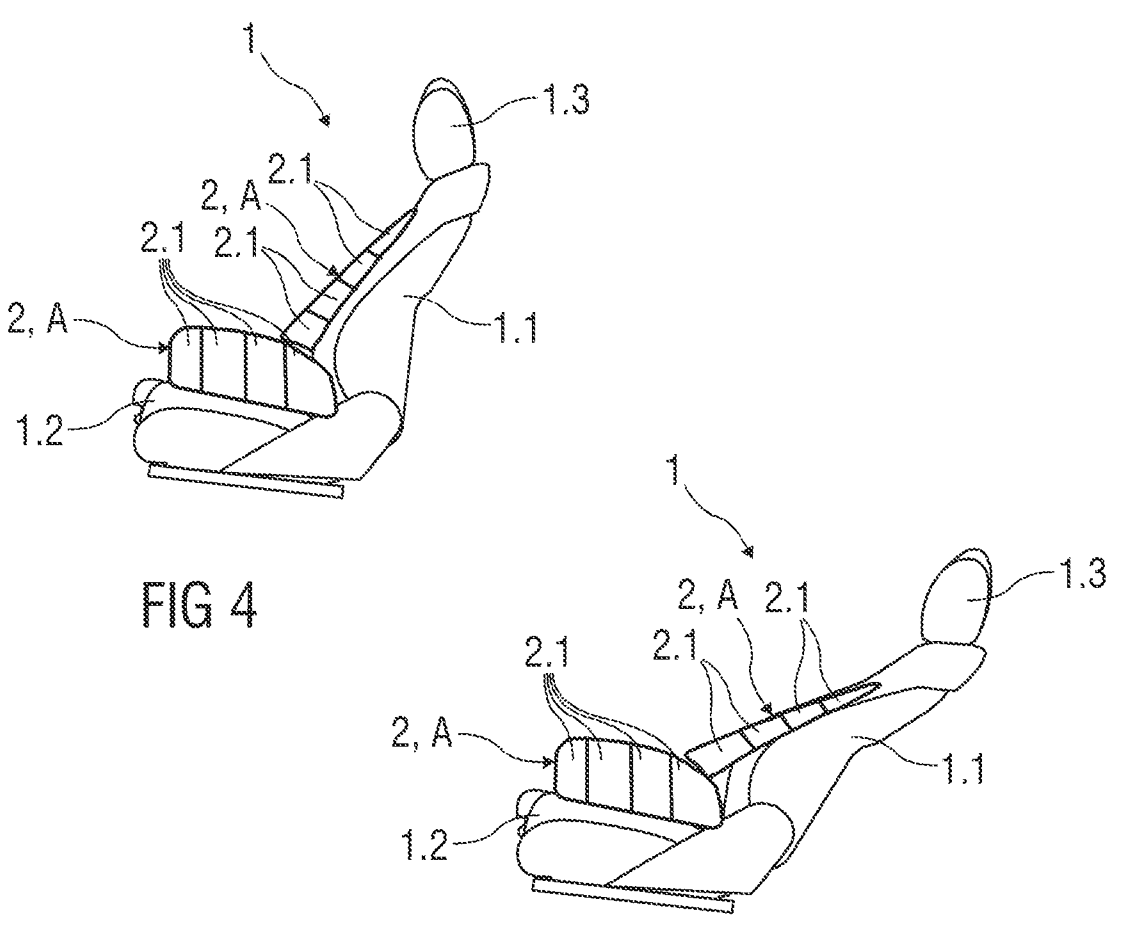
FIG 4
FIG 5
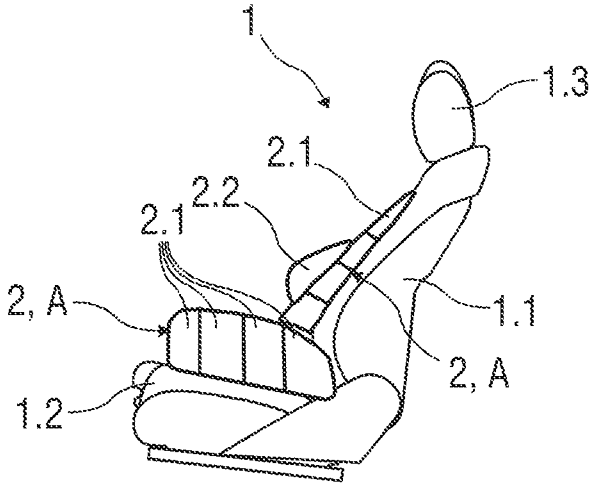
FIG 6

VEHICLE HAVING A VEHICLE SEAT

BACKGROUND AND SUMMARY OF THE INVENTION

The invention relates to a vehicle having a vehicle seat, comprising a seat back and a seat cushion forming a seat surface.

A vehicle seat for a motor vehicle is known from DE 10 2008 029 339 A1. The vehicle seat comprises on at least one upholstered region at least one adjustment element which can be changed in its volume. The adjustment element, which is provided for a seat occupant to change a seat contour in the normal operation, can be automatically introduced into a protective configuration before or in the event of a collision of the motor vehicle.

DE 199 50 702 A1 describes a motor vehicle seat having an upholstered seat part, of which the seat surface is formed by the top sides of a central part and two side panels which project slightly upwards in relation to the central part, and having an upholstered back rest, of which the support surface is formed by the front sides of a central part and two side panels projecting slightly forwards in relation to the central part. To better restrain a vehicle occupant sitting on the motor vehicle seat in the event of a side impact, and to better protect them from injuries due to intruding objects, it is provided that at least one of the side panels of the seat part and/or of the back rest can be inflated to increase the size of the projection over the respective central part.

A vehicle having at least one vehicle seat, in particular driver's seat, is disclosed in DE 10 2014 016 351 A1. The vehicle seat is mounted at least partially rotatably around the vertical axis of the vehicle and has an armrest designed as a means of protecting an occupant. The armrest and/or at least one component of the latter can be controlled for occupant protection such that the armrest and/or the at least one component can be positioned in an operating position, starting from an initial position relative to an occupant on the vehicle seat.

DE 10 2018 124 649 A1 further discloses a seat having a seat backrest, two armrest portions and two airbags. Each armrest portion is coupled on the seat backrest rotatably around a vertical axis from a stowed position, which is elongated in a forward position, to a deployed position, which extends in front of the seat backrest. Each airbag is fixed to one of the armrest portions and can be inflated into an inflated position, in which one of the airbags is arranged in front of the other airbag relative to the seat backrest.

A side air bag device is known from US 2003/0184061 A1, which device triggers an airbag between an occupant and a side wall of a vehicle to protect the occupant in the event of a side collision of the vehicle. The side airbag device comprises a first airbag and a second airbag. The first airbag is tubular, and is fixed to a seat back of a vehicle seat by means of one end, wherein another end is fixed to a point on a seat cushion of the vehicle seat. The second airbag is tubular, and one end of the second airbag is fixed to the seat back of the vehicle and another end is fixed to the seat cushion. In this side air bag device, a position of the end of the second airbag is arranged higher than a position of an end of the first airbag.

DE 10 2017 010 794 A1 discloses a vehicle seat, having an occupant protection device comprising at least one airbag that unfolds out of an armrest and which can be positioned from an initial position into an operating position. In a parked position, the armrest is arranged on a side panel of a seat back, wherein the airbag unfolds between an occupant located on the vehicle seat and a vehicle part when a vehicle seat is aligned forwards in the longitudinal direction of the vehicle, and in an alignment deviating from the forwards alignment of the vehicle seat in the longitudinal direction of the vehicle, the armrest can be automatically positioned in a position unfolded from the side panel such that an airbag exit opening in the armrest can be aligned depending on predetermined conditions in relation to the occupant located on the vehicle seat.

From DE 103 45 677 A1, a pivot bearing for pivotably mounting an armrest on a seat in a transport means is known. The pivot bearing is designed at least in one pre-determined pivot position of the armrest to permit further pivot movements of the armrest in at least one plane perpendicular to the longitudinal plane when force is applied by an expanding airbag located in the armrest.

In addition, US 2004/0075254 A1 discloses a side airbag device having several airbags, which are arranged in a side of a vehicle occupant in a folded state, and which unfold between an inner surface of a vehicle side and an occupant in the event of a side collision of the vehicle due to a gas generated by an inflator. The individual airbags have different internal pressures.

The object of the invention is to discloses a vehicle having a vehicle seat.

A vehicle comprises a vehicle seat, having a seat back and a seat cushion forming a seat surface. According to the invention, it is provided that at least one air cushion having at least one air chamber that can be filled with gas and emptied to form an armrest is arranged in at least one side region of the seat back. In normal operation, this at least one air chamber has at least one additional air chamber portion, which is separated therefrom, is not acted upon and is fluidically coupled with at least one gas generator. As an alternative or in addition, the air cushion has at least one further air chamber, which is fluidically coupled with the at least one gas generator and which is separated from the air chamber at least in normal operation, to be acted upon in the event of a collision of the vehicle, wherein the air chamber portion and/or the further air chamber unfold or unfolds at least partially between an occupant located on the vehicle seat and a trim part of the vehicle and/or between the occupant and a further occupant by being acted upon by a gas of the at least one gas generator.

A vehicle seat designed in this manner combines, by means of the armrest formed by the air cushion, a comfort function with a safety function, which is based on the additional air chamber portion and/or the at least one further air chamber, which can be acted upon in the event of a collision.

In a possible embodiment, the additional air chamber portion of the air cushion is separated from the at least one air chamber in normal operation by means of a tear seam that is designed to be impermeable to liquid. This tear seam tears if the at least one air chamber continues to be acted upon and/or if the air chamber portion is acted upon in the event of a collision of the vehicle. The air cushion enlarges due to the air chamber portion that is now additionally filled, such that a protective effect for the occupant on the vehicle seat, and optionally for the further occupant on a neighbouring vehicle seat can be realized.

In a further possible embodiment, a number of retaining straps for forming the air cushion in the acted upon state is arranged in the at least one air chamber. By means of the retaining straps, the air cushion has the form of an armrest in the acted upon state of the at least one air chamber, on which armrest an arm of the occupant can comfortably be laid, wherein the at least one air chamber substantially has a constant pressure level in the acted upon state, such that the occupant can use the armrest without a loss of pressure even during a relatively long driving operation of the vehicle.

In a further development, the additional air chamber portion and/or the further air chamber respectively have or has at least one outflow opening, which is pressure-controlled, time-controlled and/or can be actively controlled. By means of the outflow opening or the outflow openings, a pressure in the air chamber, in the additional air chamber portion and/or in the further air chamber can be reduced in a targeted manner, for example to absorb collision energy in the event of a collision. It is thus possible to substantially protect the occupant and to reduce load values caused by the collision.

An embodiment provides that the at least one air chamber of the air cushion is fluidically coupled with a gas feeding unit, which can be regulated and has a gas volume which can be pre-determined. In particular, the at least one air chamber of the air cushion can be reversibly filled by means of the gas feeding unit, such that the at least one air chamber can be filled with the gas of the gas feeding unit to form the arm rest. For example, the gas can be fed in again if the at least one gas feeding unit is intentionally emptied by the occupant, such that the at least one air chamber and the gas feeding unit represent a closed system.

In a further embodiment, the gas feeding unit is further coupled with an operating element arranged in the vehicle interior. The occupant can thus operate the operating element whenever they wish to rest their arm such that the gas feeding unit is activated. When operated again, the corresponding outflow opening can be controlled such that the air escapes from the at least one air chamber. As an alternative, the gas feeding unit is activated, which sucks the gas out of the at least one air chamber, whereby the latter is emptied.

In a further possible embodiment, the air cushion comprises a plurality of air chambers for forming an armrest, and the air chambers are filled differently in the acted upon state depending on a seat back position and/or seat cushion position. In particular, the individual air chambers have different degrees of fill, such that the armrest can serve as an armrest for the occupant both in a position of the seat back and/or of the seat cushion suitable for a sitting position and a position suitable for a reclining position.

In a development, the air cushion extends for this purpose at least partially along the seat back and the seat cushion, wherein the air cushion can be fixed to the seat back and/or to the seat cushion for its stability to form the armrest.

In addition, a further possible embodiment provides that the outflow opening of the at least one air chamber for forming the armrest is designed to open when a vehicle door opens in the immediate vicinity of the vehicle seat. In particular, the outflow opening of the at least one air chamber opens, such that the latter empties, and thus it becomes easier to get into or out of the vehicle. The occupant can thus leave their vehicle seat unimpeded or take up a position on the vehicle seat.

Exemplary embodiments of the invention are explained in more detail in the following with reference to drawings.

BRIEF DESCRIPTION OF THE DRAWINGS

FIG. 1 schematically shows a side view of a vehicle and a vehicle seat, having, in a respective side region, a seat back and an air cushion integrated into a seat cushion to form an armrest;

FIG. 2 schematically shows a front view of the vehicle seat according to FIG. 1;

FIG. 3 schematically shows a front view of the vehicle seat having armrests formed by means of the air cushion;

FIG. 4 schematically shows a side view of the vehicle seat having armrests formed by means of the air cushion;

FIG. 5 schematically shows a side view of a vehicle seat in a reclining position having armrests formed by means of the air cushion;

FIG. 6 schematically shows a side view of the vehicle seat having the formed armrests and an acted upon further air chamber;

DETAILED DESCRIPTION OF THE DRAWINGS

Figures 7, 8, 9:
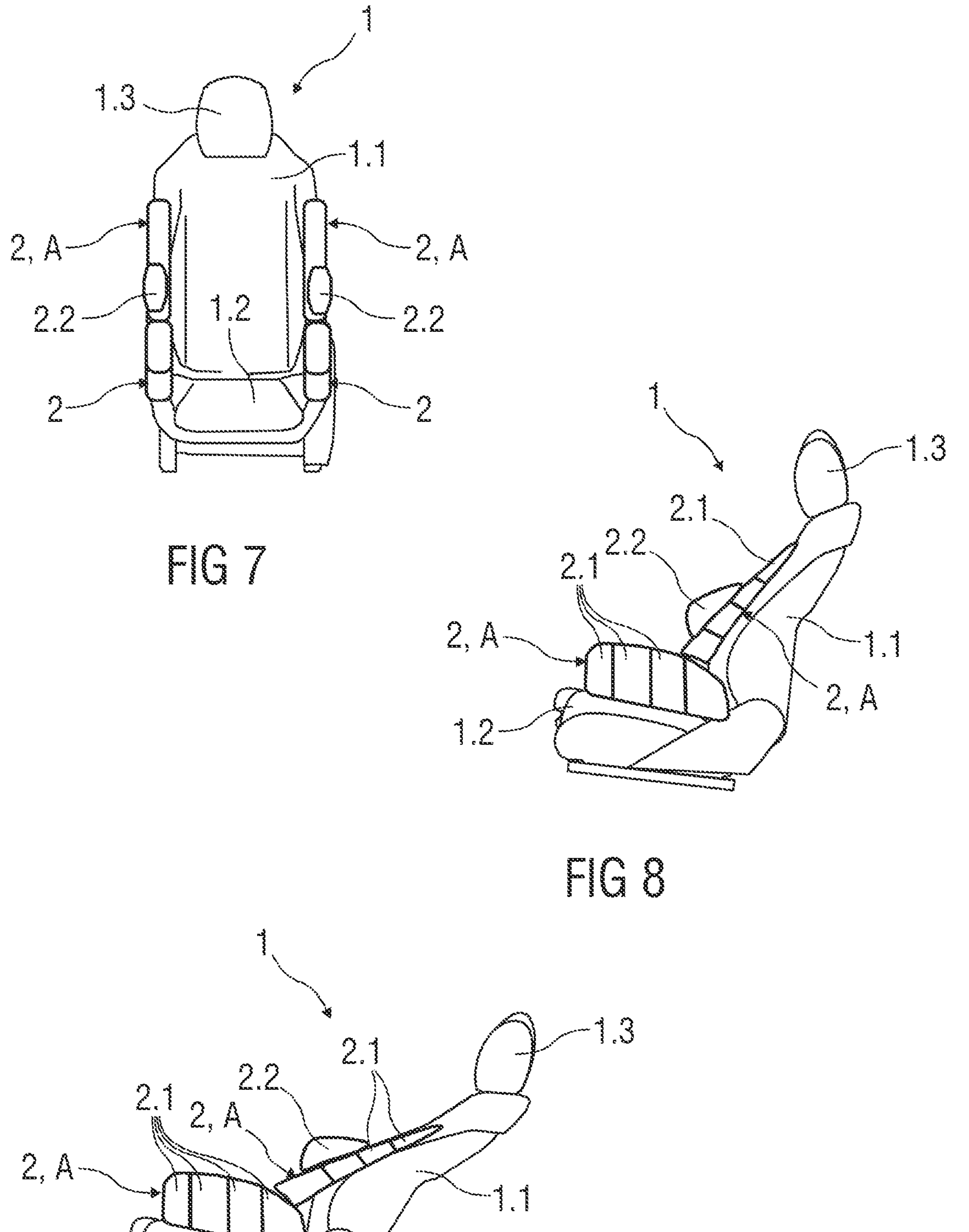
FIG. 7 schematically shows a front view of the vehicle seat in an embodiment having pyrotechnically acted upon air cushions and an acted upon further air chamber.
FIG. 8 schematically shows a side view of the vehicle seat having pyrotechnically acted upon air cushions and the acted upon further air chamber.
FIG. 9 schematically shows a side view of a vehicle seat in a reclined position having pyrotechnically acted upon air cushions and the acted upon further air chamber.

Parts corresponding to one another are provided with the same reference numerals in all figures.

FIG. 1 shows a side view of a vehicle F depicted in a significantly simplified manner and a vehicle seat 1 having an air cushion 2 integrated into a side region of a seat back 1.1 and a seat cushion 1.2 that forms a seat surface of the vehicle seat 1. A headrest 1.3 is additionally arranged on the seat back 1.1.

FIG. 2 shows a front view of the vehicle seat 1 according to FIG. 1.

In particular in vehicles F, which have an assistance system for automated driving, comfort sitting positions are offered in relation to adjustment possibilities of the vehicle seat 1. The seat back 1.1 can be positioned comparatively upright, e.g., for working, or the seat back 1.1 is positioned at an angle, for example for relaxing.

In addition to the positioning of the seat back 1.1, armrests A shown in more detail in FIGS. 3 to 9 represent a comfort aspect of the vehicle seat 1. If armrests A are present on the vehicle seat 1, there is an increased risk of injury due to the armrests A, in particular in the event of a side collision of the vehicle F.

To offer an occupant on the vehicle seat 1 the option of using armrests A, which substantially do not represent an increased risk of injury for the occupant on the vehicle seat 1 in the event of a side collision of the vehicle F, the vehicle seat is designed as described in the following.

For this purpose, the vehicle seat 1 comprises armrests A designed as air cushions 2, which, in terms of their functionality are relatively dimensionally stable, can be used reversibly, and can offer a protective function for the occupant on the vehicle seat 1 in the event of a collision of the vehicle F. These air cushions 2 can have additional functions which go beyond a normal function as an armrest A and/or for side stabilization of the occupant on the vehicle seat 1.

According to the exemplary embodiments shown in FIGS. 1 to 9, an air cushion 2 is respectively arranged in a respective side region of the seat back 1.1 and of the seat cushion 1.2.

Figure 10:
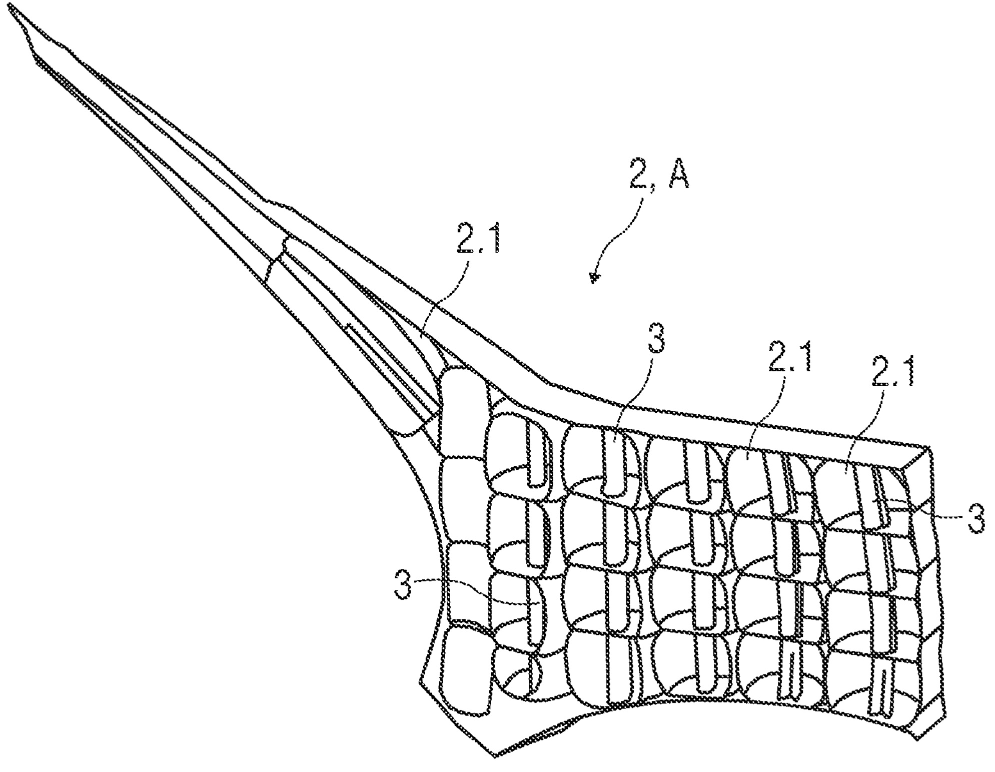
FIG. 10 schematically shows a sectional depiction of an embodiment of an air cushion for forming an armrest.

The respective air cushion 2 comprises a number of air chambers 2.1 depicted in FIGS. 4 to 6 and in FIGS. 8 to 10 in an exemplary and significantly simplified manner, which air chambers are shown in FIGS. 1 and 2 in the emptied state, i.e., in the acted upon state. In particular, the air cushions 2 are not filled when the ignition of the vehicle F is switched off, in order to thus make it possible to get into or out of the vehicle F unimpeded.

FIGS. 3 to 6 show the air cushion 2 in the filled state, wherein the armrests A are formed by means of the air cushions 2 filled, for example, with a gas or gas mixture, in particular with air.

The respective air cushion 2, i.e., the respective air chambers 2.1, has or have a pre-determined geometry, and are fluidically coupled with a gas feeding unit (not depicted in more detail) to be acted upon. For example, a gas feeding unit is coupled with an air cushion 2. It can also be provided that several gas feeding units are provided, such that, for example, a gas feeding unit is respectively fluidically coupled with an air cushion 2.

To act upon the air cushion 2 to form an armrest A on the vehicle seat 1, the gas feeding unit is or the gas feeding units are coupled with an operating element arranged in the vehicle interior for their respective activation.

If the occupant sitting on the vehicle seat 1 requires armrests A, the occupant operates the operating element. The gas feeding unit is or the gas feeding units are thus activated, such that the air cushions 2 are in particular acted upon by air. It is also conceivable that an operating element, for example as an icon on a touch-sensitive display unit, is respectively assigned to an air cushion 2, and the occupant can select which air cushion 2 is filled with air by operating the operating element assigned to the air cushion 2, in order to form the armrest A, and thus optionally to increase a side restraint of the occupant on the vehicle seat 1.

The armrests A formed by means of the air cushion 2 have a pre-determined armrest contour due to the corresponding shaping.

The armrests A can be used both in an upright position of the seat back 1.1, as is shown in FIG. 4, and when the seat back 1.1 is tilted, as is shown in FIG. 5. This means that the air cushions 2, in particular their air chambers 2.1, can be acted upon by air independently of an adjustment of the seat back 1.1, and also of the seat cushion 1.2, to form the armrests A. In addition, an occupant on the vehicle seat 1 can adjust a degree of fill desired for the respective air cushion 2, for example by operating the respective operating element.

By a design of the air chambers 2.1 and different degrees of fill of the air chambers 2.1 of the respective air cushion 2, different heights of the armrests A can thus be adjusted.

In a possible embodiment, the respective air cushion 2 or a particular number of air chambers 2.1 of the respective air cushion 2 has at least one outflow opening S that is pressure-controlled, time-controlled and/or can be actively controlled.

By means of these outflow openings S, air can be released in a controlled manner from the air cushions 2 in the event of a collision of the vehicle F when the load of the occupant acts laterally and/or when the occupant moves laterally on the vehicle seat 1 due to a collision. An internal pressure of the corresponding air cushion 2 thus reduces, whereby collision energy can be absorbed by means of the air cushion and occupant loads that have arisen can be reduced.

To increase an injury protection for the occupant sitting on the vehicle seat 1, in particular to automatically position an arm resting on the armrest A in the event of a collision of the vehicle F, at least the air cushions 2 arranged on the seat back 1.1 comprise a further air chamber 2.2, which is depicted in the filled state in FIGS. 6 to 9.

FIG. 6 shows a side view and FIG. 7 shows a front view of the vehicle seat 1 with a filled air cushion 2 and the pyrotechnically filled further air chamber 2.2, wherein the air chambers 2.1 can also be pyrotechnically filled, as is described in the following. In FIG. 8, a side view of the vehicle seat 1 with an upright seat back 1.1 is depicted, and in FIG. 9, a side view with an increased incline of the seat back 1.1 is depicted.

This further air chamber 2.2 is not acted upon by air when forming the armrests A, and thus when the comfort function is activated, and thus remains folded in its initial position, which is substantially not visible.

The further air chamber 2.2 is fluidically coupled with a gas generator (not depicted in more detail) that can be pyrotechnically triggered. This gas generator is coupled with a collision sensor system of the vehicle F, in particular an airbag control device, via signal technology.

If a collision of the vehicle F is recorded using recorded signals that exceeds a pre-determined threshold value, and the air cushions 2 provided to form the armrests A are filled with air, and thus the comfort function is activated, then the gas generator is ignited. By means of the gas generator, a gas is released, with which the further air chamber 2.2 is filled, and thus its protective effect can be realized for the occupant on the vehicle seat 1, in particular to position the arm.

In particular, the further air chamber 2.2 is acted upon if the vehicle F is involved in a side collision or in a frontal collision with lateral cover.

As an alternative or in addition to the further air chamber 2.2, the respective air cushion 2 can have an additional air chamber portion which, in normal operation, is separated therefrom, is not acted upon, and is fluidically coupled with at least one gas generator. In particular, this air chamber portion is separated from a respective neighbouring air chamber 2.1 by means of a tear seam. In the event of a collision, the additional air chamber portion is filled and takes up its operating position. The tear seam tears, such that the air chamber portion is fluidically connected to the respectively neighbouring air chamber 2.1, and an internal pressure can be reduced via a respective outflow opening S for energy absorption.

In a further embodiment, it can also be provided that, as long as the comfort function is not activated in relation to the armrests A, the armrests are also pyrotechnically filled in the event of a collision.

In a pre-determined, e.g., pressure-dependent and/or time-dependent state of the air cushion 2, the outflow openings S are controlled such that the gas can escape in a targeted manner at least from the air chambers 2.1, and collision energy is thus absorbed. The occupant can thus be protected from injuries, and an occupant load can be reduced.

For example, it is possible to limit the pyrotechnical application to selected air chambers 2.1, which are in particular arranged in a manner optimized with regard to injury protection. This is only achieved, however, if this is evaluated as sufficient with regard to a protective effect. In this case, only partial regions of the air cushion 2 comprising the air chambers 2.1, 2.2 are actively acted upon by the gas in the event of a collision.

It can additionally be provided that the air chambers 2.1, 2.2 of the respective air cushion 2 that are active in a collision are pneumatically reversibly or partially reversibly triggered in advance, i.e., filled, as so-called pre-safe measures, in particular by means of the gas feeding unit or gas feeding units. In a subsequent collision of the vehicle F, a corresponding occupant protection can be realized by means of energy absorption by pressure-dependent and/or time-dependent opening of the outflow openings S.

For example, it is possible to replace one side airbag per seat side with a thorax-pelvis protection region by means of the air cushion 2.

In FIG. 10, a sectional depiction of an air cushion 2 arranged on the seat back 1.1 is shown. The air chambers 2.1 and the retaining straps 3 arranged for shaping are depicted in detail. The retaining straps 3 are fixed in the corresponding air chamber 2.1 with their respective end, and in the acted upon state, the air cushion 2 has an armrest contour.

LIST OF REFERENCE CHARACTERS

1 vehicle seat
1.1 seat back
1.2 seat cushion
1.3 headrest
2 air cushion
2.1 air chamber
2.2 further air chamber
3 retaining strap
A armrest
F vehicle
S outflow opening

The invention claimed is:

1. A vehicle (F), comprising:
- a vehicle seat (1) that has a seat back (1.1) and a seat cushion (1.2); and
- an air cushion (2) that is disposed in at least one side region of the seat back (1.1);
- wherein the air cushion (2) has a first air chamber (2.1) that is fillable with a gas from a gas feeding unit which is operable by an occupant of the vehicle (F) to form an armrest (A) in a normal operation to provide a comfort function;
- wherein the air cushion (2) has an air chamber portion which, in the normal operation, is not filled with the gas and is separated from the first air chamber (2.1) by a tear seam that is impermeable to liquid and wherein in an event of a collision of the vehicle (F) the tear seam tears such that the air chamber portion is fluidically connected to the first air chamber (2.1) and such that the air chamber portion is filled with the gas to provide a safety function;
- wherein the air chamber portion unfolds at least partially between a first occupant when located on the vehicle seat (1) and a trim part of the vehicle (F) and/or between the first occupant and a second occupant.

2. The vehicle (F) according to claim 1, wherein a plurality of retaining straps (3) are disposed in the first air chamber (2.1).

3. The vehicle (F) according to claim 1, wherein the first air chamber (2.1) and the air chamber portion have a respective outflow opening(S) which is pressure-controlled, time-controlled, or actively controlled.

4. The vehicle (F) according to claim 3, wherein the outflow opening(S) of the first chamber (2.1) is configured to open when a door of the vehicle opens in an immediate vicinity of the vehicle seat (1).

5. The vehicle (F) according to claim 1, wherein the gas feeding unit is regulatable and has a gas volume that is pre-determinable.

6. The vehicle (F) according to claim 5, wherein the gas feeding unit is coupled with an operating element disposed in an interior of the vehicle.

7. The vehicle (F) according to claim 1, wherein the air cushion (2) comprises a plurality of first air chambers (2.1) for forming the armrest (A) and wherein the plurality of first air chambers (2.1) are fillable differently with gas depending on a seat back adjustment and/or a seat cushion adjustment.

8. The vehicle (F) according to claim 1, wherein the air cushion (2) extends at least partially along the seat back (1.1) and the seat cushion (1.2).

9. A vehicle (F), comprising:
- a vehicle seat (1) that has a seat back (1.1) and a seat cushion (1.2); and
- an air cushion (2) that is disposed in at least one side region of the seat back (1.1);
- wherein the air cushion (2) has a first air chamber (2.1) that is fillable with gas from a gas feeding unit which is operable by an occupant of the vehicle (F) to form an armrest (A) in a normal operation to provide a comfort function;
- wherein the air cushion (2) has a second air chamber (2.2) which, in the normal operation, is not filled with a gas, is fluidically coupled with a pyrotechnically triggered gas generator, and is fillable with a gas of the pyrotechnically triggered gas generator in an event of a collision of the vehicle (F) to provide a safety function;
- wherein the second air chamber (2.2) unfolds at least partially between a first occupant when located on the vehicle seat (1) and a trim part of the vehicle (F) and/or between the first occupant and a second occupant by being filled by the gas of the pyrotechnically triggered gas generator.

10. The vehicle (F) according to claim 9, wherein a plurality of retaining straps (3) are disposed in the first air chamber (2.1).

11. The vehicle (F) according to claim 9, wherein the first air chamber (2.1) and the second air chamber (2.2) have a respective outflow opening(S) which is pressure-controlled, time-controlled, or actively controlled.

12. The vehicle (F) according to claim 11, wherein the outflow opening(S) of the first chamber (2.1) is configured to open when a door of the vehicle opens in an immediate vicinity of the vehicle seat (1).

13. The vehicle (F) according to claim 9, wherein the gas feeding unit is regulatable and has a gas volume that is pre-determinable.

14. The vehicle (F) according to claim 13, wherein the gas feeding unit is coupled with an operating element disposed in an interior of the vehicle.

15. The vehicle (F) according to claim 9, wherein the air cushion (2) comprises a plurality of first air chambers (2.1) for forming the armrest (A) and wherein the plurality of first air chambers (2.1) are fillable differently with gas depending on a seat back adjustment and/or a seat cushion adjustment.

16. The vehicle (F) according to claim 9, wherein the air cushion (2) extends at least partially along the seat back (1.1) and the seat cushion (1.2).

* * * * *